Sept. 19, 1950 N. G. BRANSON 2,522,924
SUPERSONIC INSPECTION APPARATUS
Filed July 3, 1946 3 Sheets-Sheet 1

FREQUENCY APPLIED TO CRYSTAL IN MEGACYCLES

Norman G. Branson INVENTOR
by Williams, Rich & Morse
ATTORNEYS

Sept. 19, 1950 N. G. BRANSON 2,522,924
SUPERSONIC INSPECTION APPARATUS
Filed July 3, 1946 3 Sheets-Sheet 2

Norman G. Branson,
INVENTOR,
by Williams, Rich & Morse
ATTORNEYS

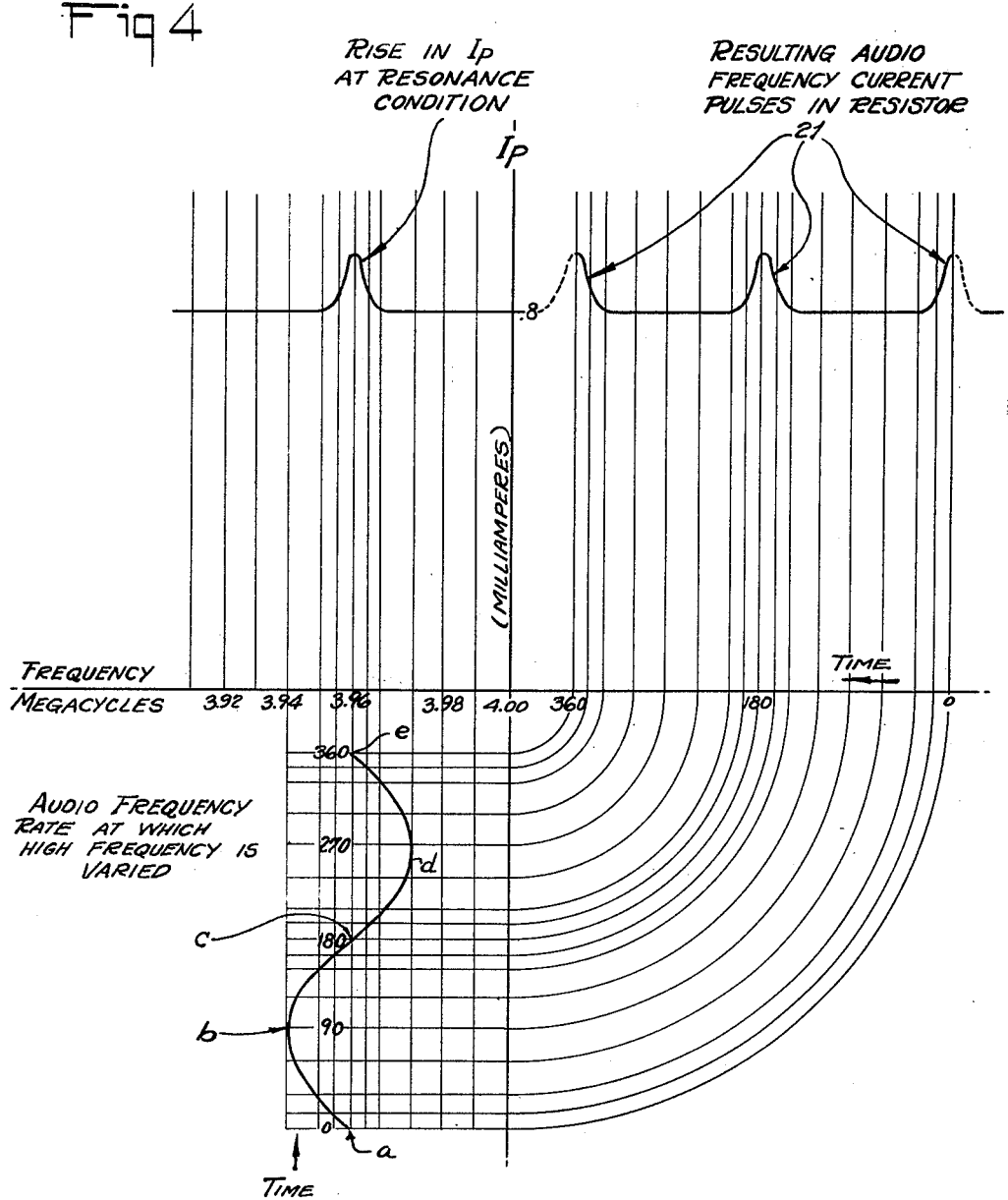

Patented Sept. 19, 1950

2,522,924

UNITED STATES PATENT OFFICE 2,522,924

SUPERSONIC INSPECTION APPARATUS

Norman G. Branson, Danbury, Conn., assignor to Branson Instruments, Inc., Danbury, Conn., a corporation of Connecticut Application July 3, 1946, Serial No. 681,383

4 Claims. (Cl. 73—67)

1

This invention relates to the inspection of solid elastic materials by means of supersonic vibrations, under conditions where access to only one surface of the material may be had, for the determination of thickness, detection of cracks and flaws and for other purposes.

In the drawings:

Fig. 4 is a graphical explanation of the production of electrical pulses at an audio frequency rate by means of the apparatus of Fig. 3.

Figure 1:
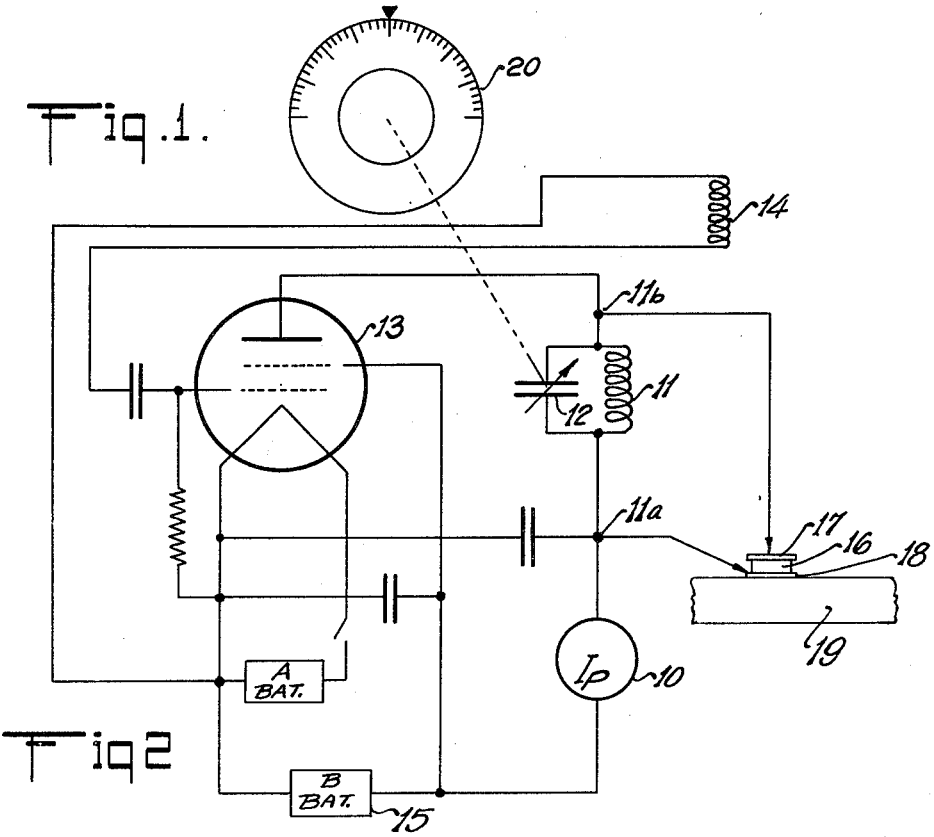
Fig. 1 is a schematic circuit diagram of a known form of apparatus for making thickness and other determinations by means of supersonic vibrations.

Referring to Fig. 1, there is shown a known instrument, adapted primarily to the determination of the thickness of metal bodies by the application to an external surface thereof of supersonic vibrations produced in a quartz crystal by an oscillating circuit which operates in a well known manner. The circuit shows a self-excited high frequency oscillator having a milliammeter 10 connected in series with the plate circuit to indicate the average plate current $Ip$. A tank circuit, comprising the inductance 11 and variable capacitance 12, is connected in the plate circuit of the oscillator tube 13 in the usual manner. A coil 14 is electrically coupled to the tank circuit inductance 11 so that oscillations will be generated. The mode of operation of such an oscillator is so well understood by those skilled in the art that it need not be further explained.

It will be understood that energy to supply the losses in this oscillator must be supplied by the "B" battery 15. Since this battery maintains a substantially constant voltage, any increase in the energy drain from the battery will produce a proportional current drain which will be indicated by the milliammeter 10.

If an X-cut quartz crystal 16 is connected across the tank circuit at 11a and 11b, through the medium of thin conducting plates 17 and 18 applied to its surfaces, the high frequency alternating voltage generated across the tank circuit will be applied to the crystal and cause it to vibrate mechanically, changing thickness at the frequency of the applied voltage. Now if one of the faces of the crystal is placed in intimate

2 contact with a surface of the body to be inspected, for example a steel plate 19, the high frequency vibration of the crystal will transmit a supersonic vibration to the steel. An oil film between the crystal face and the steel surface is used to give good mechanical coupling.

Due to the damping or mechanical hysteresis inherent in all materials, there will be a certain amount of energy dissipation when such a vibration is set up in the steel plate. This energy is supplied from the tank circuit which must, in consequence, draw an increased amount of energy from the battery 15. The increased current flow will be indicated by meter 10.

Figure 2:
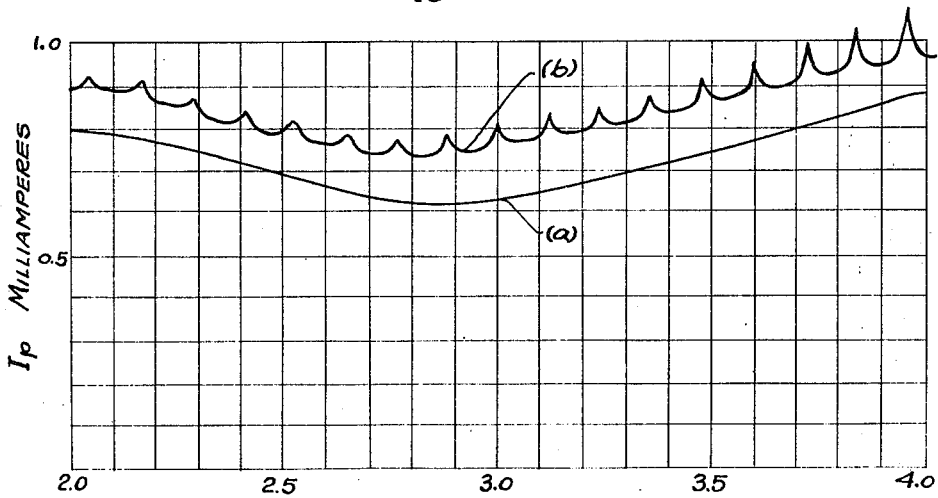
Fig. 2 is a graph of plate current curves, shown as a function of frequency, under two different conditions of operation of the apparatus of Fig. 1.

There are several forms of energy losses in the tank circuit which will affect the reading on meter 10 and a change in any one of these losses will produce a change in the plate current $Ip$ which it indicates. These energy losses include the $I^2R$ loss of coil 11, losses due to energy radiated into space, and losses produced by eddy currents being generated in conducting materials which are in the magnetic field of coil 11. Also, in the instrument described, there are losses due to the energy required to drive the quartz crystal 16. Curve $a$ of Fig. 2 shows $Ip$ over a frequency range from 2 to 4 mc. where the crystal 16 is not in contact with the surface of plate 19. The gradual variation shown is produced by gradual changes in the losses above mentioned as the frequency is changed.

Now, if crystal 16 is brought into intimate driving contact with the surface of plate 19, which is assumed, for illustrative purposes to be a steel plate 1 inch thick, there will be sharp increases in the plate current as shown by curve $b$, Fig. 2, at certain frequencies, the intervals between these increases, shown by peaks on the curve, being always the same. The cause of these increases will now be explained.

The high frequency vibrations of crystal 16, which is in contact with plate 19, set up in the plate vibrations which travel through it at the speed with which sound travels through it. These vibrations are hereinafter referred to as compressional waves. Assuming the plate to be an inch thick and the speed of sound in the steel, at the frequencies used, to be 240,000 inches per second, it will be evident that a compressional wave will travel through the plate and back in $1/120{,}000$ part of a second, the velocity of the wave divided by twice the thickness. Now if the crystal is made to vibrate by the oscillator at the rate of 120,000 cycles per second, by adjustment of the tank circuit through varying the capacitance 12, a resonance condition results, there will be a large increase in the amplitude of vibration and a standing wave will be set up in the steel plate. Under this condition there will be a sharp increase in the losses due to damping and hysteresis since the hysteresis loss is proportional to the amplitude of vibration. This increased loss will be indicated by meter 10 as an increase in plate current.

The minimum or fundamental frequency at which the above described resonance condition can be obtained is a frequency at which the time required for one cycle is equal to the time required for a compressional wave to travel a distance which is twice the thickness of the plate. However, similar increases in plate current will occur at frequencies which are harmonics of the fundamental frequencies and the increases shown on curve b of Fig. 2 occur at such harmonic frequencies. In the example given above, the fundamental frequency is 120,000 cycles per second. Resonance conditions will exist at 240,000, 360,000, 480,000, 600,000 cycles per second, and so on. Experience and tests have shown that even the hundredth and higher harmonics will produce an increase in plate current Ip which is readily detectable providing a suitable means is provided for detecting it. The increases in Ip at harmonic frequencies are, generally speaking, weaker than the increase at the fundamental frequency though it will be observed that curve b Fig. 2, shows higher resonance peaks at the higher frequencies. One reason for this is that, for a given crystal being driven at a frequency lower than its own natural frequency, the crystal vibrates more strongly as its natural frequency is approached.

Instruments heretofore devised and operating as above described have depended upon visual indications of increases in plate current on a sensitive D. C. instrument such as a milliammeter, as taught for example by U. S. Patent No. 2,431,233 to Erwin. The operator of the instrument, while adjusting capacitance 12, watches for fluctuation of a needle indicating increases which are then related to frequency as shown on a dial 20 moving with capacitance 12. Such indicating instruments are inherently slow in response or sluggish and it is very easy to pass over a resonance point without obtaining any indication on the meter unless the dial 20 is turned very slowly. Another disadvantage is that increasing the sensitivity of the D. C. meter, to get indications of smaller changes in current such as may occur at resonant frequencies, cannot be carried very far before the instrument becomes so delicate as to be wholly unsuited for use under field conditions. Moreover, under actual working conditions in the field of application for which such instruments are designed, the operator has a number of other things to watch, such as the application of the crystal to the material under test and its positioning. Practical testing would be easier and more rapid if he did not also have to watch carefully for slight fluctuations of a needle on a meter. Other known instruments determine the resonant frequencies causing increases in plate current by means of an oscilloscope or a stroboscopic light source used in conjunction with means for continuously cyclically tuning a radio frequency generator over a predetermined frequency range as taught by U. S. Patent No. 2,431,234 to Rassweiler and Erwin. However, the use of such complex and cumbersome apparatus as oscilloscopes and stroboscopes is not convenient for use in a portable field instrument.

Therefore the present invention has for its principal object the provision of an audible indication of resonant frequency conditions in apparatus of the type described. Another object is to provide a thickness detector which is capable of being built as a very small, light, rugged unit well adapted for use in the field, especially in locations where it is not feasible to use more cumbersome or delicate instruments. Another object is to provide apparatus in which the indications of resonance can be obtained more rapidly and with less chance of error so that more accurate measurements can be made with greater speed. A further object is to provide means for amplifying the indications of increased plate current to give greater sensitivity to the instrument without decreasing its ruggedness and suitability for field use. In providing an instrument producing audible indications, a further advantage results in that conditions may be detected by the pitch of the sound, and interpreted by an experienced operator, which cannot be detected where the information depends only on current amplitude.

Other objects and advantages will appear in the course of the ensuing description.

Figure 3:
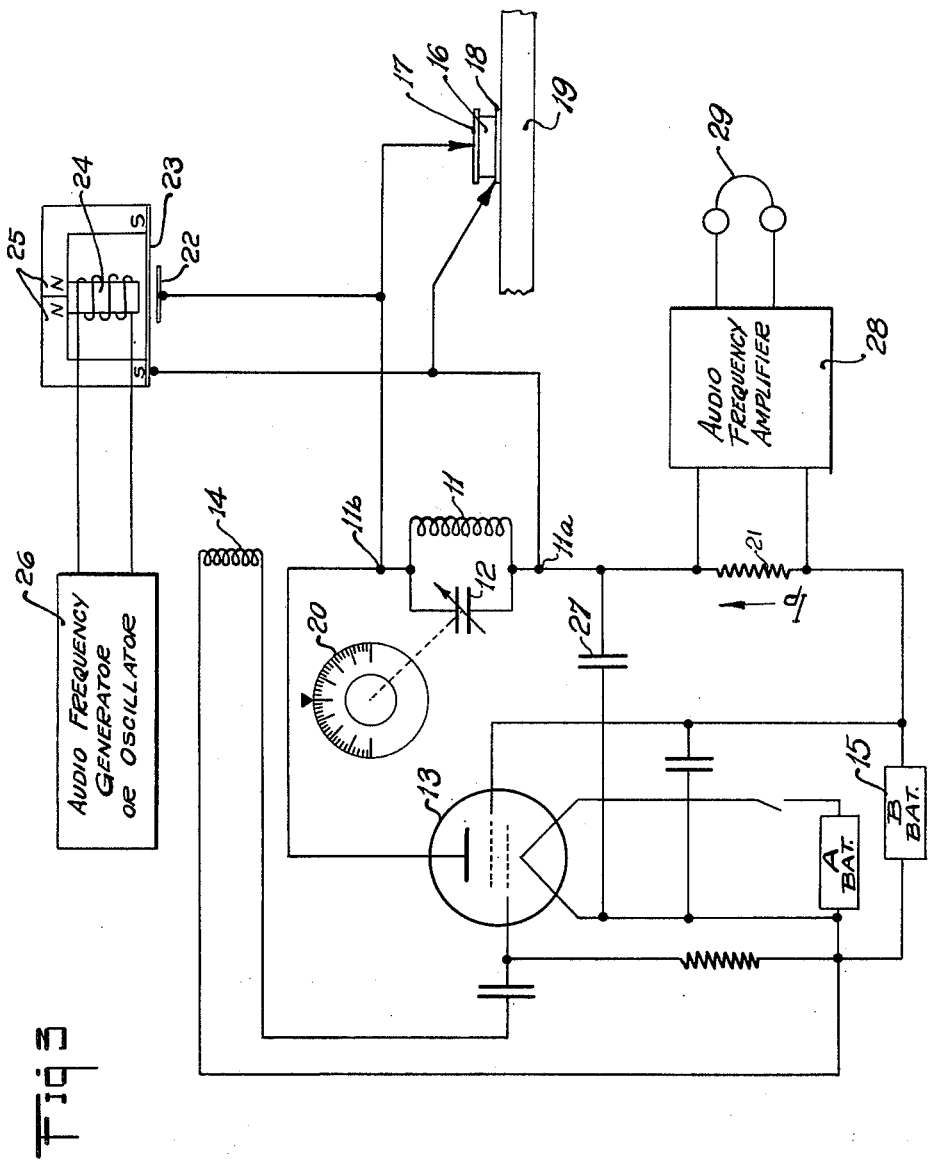
Fig. 3 is a schematic circuit diagram of apparatus in accordance with the invention, which functions to give audible indications of conditions under determination.

In accordance with the invention, the basic apparatus described above in conjunction with Fig. 1 is modified, as shown in Fig. 3, by a frequency modulation circuit associated with the oscillator output and crystal circuit and by the use, in place of meter 10, of audio frequency receiving means. The frequency modulation means operates to produce pulses of current at an audio frequency rate whenever the high frequency oscillator is adjusted to a frequency which produces a resonant condition. As hereinafter more particularly explained, the range of frequency modulation is restricted to a value which is less than the frequency difference between two adjacent frequencies producing resonant conditions.

Referring to Fig. 3, a resistor 21 replaces the D. C. milliammeter 10 shown in Fig. 1. When there is an increase in plate current Ip there will be a proportional increase in the voltage across resistor 21. A capacitor consisting of the two condenser plates 22 and 23 is connected across the "tank circuit" so that a variation in the spacing between plates 22 and 23 will change the frequency generated by the high frequency oscillator. The capacitor plate 22 is fixed but the plate 23 is a flexible steel diaphragm supported at its outside edge by permanent magnets 25 having like poles in contact with the diaphragm. An electromagnet 24 is provided with one pole in close proximity to the steel diaphragm 23. The permanent magnets 25 produce a constant attractive force on the diaphragm 23 so that when an alternating current flows in the coil of the electromagnet 24 there will be an increase in the attractive force on one half cycle and a decrease in the attractive force on the following half cycle. A suitable audio frequency generator 26 produces the desired alternating current in the electromagnet 24 so diaphragm 23 will be caused to vibrate at the frequency supplied by the generator 26. The vibration of the condenser plate 23 will cause the capacitance of the condenser consisting of plates 22 and 23 to be varied at the desired audio frequency rate. The total variation of the capacity of this condenser is limited to a value such that the frequency modulation affects a frequency range which includes only one resonance peak for any given setting of the capacitor 12. This in turn causes the high frequency alternating voltage developed across the tank circuit to be frequency modulated at an audio frequency rate. Other means may of course be employed to move plate 23 relative to plate 22 at an audio frequency rate, the particular means shown being merely illustrative.

The device is operative even when the range of frequency modulation is as high as 95% of the frequency difference between two adjacent resonant frequencies. In such a case it is true that the audible signal would be obtained over a considerable range of adjustment of the tuner scale, on which the frequency is read. However, the location of the resonant frequency is easily determined with reasonable accuracy even under these conditions because the point midway between the readings where the audible signal begins and ends indicates the resonant frequency. The error in reading will not be over 5%. Under many practical conditions, for example, when the work is pitted and hence does not have a uniform thickness or when the material has high internal damping, it is necessary to modulate over an appreciable range because the resonance peaks are not sharp. When conditions permit, however, the frequency change with modulation is preferably made small with relation to the frequency difference between adjacent frequencies producing resonance so as to produce the highest possible accuracy.

For an explanation of how pulses of current will be produced at an audio frequency rate in the resistor 21, reference is made to Fig. 4. The upper left-hand quadrant of Fig. 4 shows a section of the $Ip$-versus-frequency curve $b$ of Fig. 2, with a segment of the frequency axis spread out to show the change in plate current with frequency at and near a resonance condition. The lower left-hand quadrant of Fig. 4 shows how the frequency of the high frequency oscillator is varied over a small high frequency increment at an audio frequency rate. In this illustration, at time $a$ the frequency applied to the crystal would be 3.96 mc., at time $b$ 3.94 mc., at time $c$, again 3.96 mc., at time $d$, 3.98 mc., and at time $e$ back to 3.96 mc. to complete the audio cycle. By projection to the upper right-hand quadrant, the current $Ip$ in resistor 21 is plotted as a function of time. (The condenser 27 by-passes high radio frequency pulses which would otherwise also be produced in resistor 21, but the condenser is small enough to have negligible effect in by-passing the audio frequency pulses of voltage appearing across the resistor 21.) The desired amount of amplification can now be provided by an amplifier 28, and the electrical output of this amplifier can be converted into audible sound by means of a suitable loudspeaker or head-phones 29.

From the foregoing it will be evident that when the tank circuit is tuned by means of capacitor 12 to a frequency which produces a resonant vibration in the material to which the crystal is applied, the rise in plate current $Ip$ will be indicated by sound in the audio frequency receiver or head-phones 29. When the oscillator is tuned to produce frequencies which do not produce resonant conditions in the material, the frequency modulation of the radio frequency oscillator will not result in any sound since the value of $Ip$ will be substantially constant throughout the range of radio frequencies affected by the frequency modulation and the current through resistor 21 will likewise be constant. Hence there will be no audio frequency pulses. Representing the latter condition graphically, if the $Ip$ line in the upper left quadrant of Fig. 4, showed constant current, the current $Ip$ in resistor 21 would likewise be represented as constant in the upper right quadrant.

In operation of the above described instrument it will be understood that the crystal 16 may be mounted in a suitable holder and provided with electrodes for easy application to the surface of materials to be examined. Where curved objects, such as pipes, are to be examined the crystal may be cut with curved surfaces for better contact. However, tests have shown that small flat crystals can be used on pipes of almost any diameter with good results if a suitable supersonic compressional wave is used with the detecting means described herein. When a flat crystal is used on pipes which are relatively thick with respect to the pipe diameter, there is considerable scattering of the supersonic compressional wave and resonance indications will not be as sharp as for relatively flat plates or large pipes but there are audible indications produced which are characteristics of pipes of this type. It is preferred, for several reasons, to operate the instrument at frequencies considerably above the fundamental resonant frequency of the work and utilize harmonic frequencies to interpret the conditions. Higher frequencies permit a smaller crystal to be used and they appear to produce a more highly directional supersonic sound wave giving a more accurate indication of underlying conditions. Furthermore, an instrument operating on higher frequencies has the capacity to produce resonant conditions in a wider range of thicknesses. A range from about 4 mc. to about 7 mc. has been found to be very convenient for general work.

In utilizing the indications of frequencies which are harmonics of the fundamental resonant frequency of the particular material under test it is of course necessary to observe the frequency difference between two adjacent resonance indications, as observed on the frequency scale 20. This difference corresponds to the fundamental resonant frequency and is converted into thickness by means of any suitable curve sheet, conversion scale or calculation. By providing a suitably calibrated scale with an adjustable zero position the instrument may be adapted to give direct readings of thickness for any given material.

Such instruments are particularly useful in determining the wall thickness of tanks, pipes, hollow propellers and any other articles where access can be had only to an external surface and where the interior conditions of corrosion and the like are unknown. They are capable of giving very accurate and rapid indications. It has been mentioned above that an advantage of audible indications is that they give more information about internal conditions than mere current amplitude indications. An example of this is in the examination of pipes, stills and the like subject to corrosion and pitting. It has been shown that with an audible indication of resonant conditions it is easy to distinguish between smooth and pitted surfaces by learning to distinguish the pitch and character of the sounds produced in the instrument by such conditions.

By the skilled use of the instrument it may be used to determine not only thickness but the existence of cracks and other flaws not apparent on the surface. It may be used on all solid materials having elasticity such as metals generally, glass, plastics and many others. While the contents of vessels or pipes etc. do not interfere with determination of conditions such as those mentioned, it has been found to be possible to determine liquid levels in closed containers by distinguishing the indications produced when the crystal is placed above and below the liquid level.

The invention is not to be construed as limited to the particular embodiment herein described for purposes of illustration since many changes in the details thereof may be made without departing from the spirit of the invention as defined in the claims.

What is claimed is:

1. In a supersonic testing instrument having a vacuum tube oscillator comprising a plate circuit including a tunable tank circuit, the output of the oscillator driving a quartz crystal adapted to transmit vibrations to a body to determine the resonance frequency of said vibrations therein, said oscillator including means for indicating the frequency generated thereby, means for audibly indicating resonance conditions comprising, a variable capacitor connected across said tank circuit, means responsive to audio frequency current for varying said capacitor at the audio frequency rate, an audio frequency current generator for energizing said means, a resistor in said plate circuit, and audio frequency receiving means connected across said resistor for producing said audible indication of resonance.

2. In a supersonic testing instrument, in combination, a tunable vacuum tube oscillator having a plate circuit and adapted to generate radio frequency oscillations, a piezoelectric element connected to the output of said oscillator and adapted to transmit vibrations to a body, means for selectively tuning said oscillator over a range of frequencies including at least two frequencies which produce resonance in said body, means for indicating the frequency of the oscillations generated by said oscillator, means for frequency modulating said radio frequency oscillations at an audio frequency rate over a range less than the frequency difference between adjacent frequencies producing resonance, and means responsive to audio frequency current connected in said plate circuit to indicate resonant conditions.

3. In a supersonic testing instrument in combination, a tunable vacuum tube oscillator having a plate circuit and adapted to generate radio frequency oscillations, a piezoelectric element connected to the output of said oscillator and adapted to transmit vibrations to a body, manual selective tuning means for said oscillator adapted to cover a range of frequencies including at least two frequencies which produce resonance in said body, means for indicating the frequency of the oscillations generated by said oscillator, means including a continuously cyclically tuned capacitor for frequency modulating said radio frequency oscillations at an audio frequency rate over a range less than the frequency difference between adjacent frequencies producing resonance, and means responsive to audio frequency current connected in said plate circuit.

4. In a supersonic testing instrument, in combination, a tunable vacuum tube oscillator having a plate circuit including a tunable tank circuit and adapted to generate radio frequency oscillations, a piezoelectric element connected to the output of said oscillator and adapted to transmit vibrations to a body, means for selectively tuning said oscillator over a range of frequencies including at least two frequencies which produce resonance in said body, means for indicating the frequency of the oscillations generated by said oscillator, a variable capacitor connected across said tank circuit, means for continuously varying said capacitor at an audio frequency rate to frequency modulate said radio frequency oscillations over a range less than the frequency difference between adjacent frequencies producing resonance, and indicating means responsive to audio frequency current connected in said plate circuit.

NORMAN G. BRANSON.

REFERENCES CITED

The following references are of record in the file of this patent:

UNITED STATES PATENTS

| Number | Name | Date |
|---|---|---|
| 1,990,085 | Mudge et al. | Feb. 5, 1935 |
| 2,063,944 | Pierce | Dec. 15, 1936 |
| 2,174,176 | Journeaux et al. | Sept. 26, 1939 |
| 2,368,052 | Unger | Jan. 23, 1945 |
| 2,431,233 | Erwin | Nov. 18, 1947 |
| 2,431,234 | Rassweiler et al. | Nov. 18, 1947 |